May 23, 1944.  K. R. BROWN ET AL  2,349,609
ELECTRICAL PROTECTIVE DEVICE
Filed Nov. 3, 1941  4 Sheets-Sheet 4

Kenneth R. Brown,
Carl E. Mosley,
Inventors
Haynes and Koenig
Attorneys

Patented May 23, 1944

2,349,609

UNITED STATES PATENT OFFICE 2,349,609

ELECTRICAL PROTECTIVE DEVICE

Kenneth R. Brown, Des Moines, Iowa, and Carl E. Mosley, Overland, Mo., assignors to W. N. Matthews Corporation, St. Louis, Mo., a corporation of Missouri Application November 3, 1941, Serial No. 417,670

8 Claims. (Cl. 175—294)

This invention relates to electrical protective devices, and with regard to certain more specific features to protective devices for use in connection with transformers.

Among the several objects of the invention may be noted the provision of a protective device which more reliably and effectively protects both against transformer failures and against a wide range of over-load and short-circuit conditions on the transformer load lines; the provision of a device of the class described which avoids the use of the ordinary inaccessible, protective weak links in the transformer windings, and which also avoids the use of external primary or secondary fuses, either of which have operating disadvantages; the provision of a device of the class described which has a characteristic inverse time-current relationship which coordinates closely with that of the transformer when under safe loading conditions; the provision of a low-cost device of the class described which has a high degree of adaptability to various transformers and which is adapted to locations thereon easily accessible for resetting, repairs and replacements. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a side elevation, parts being broken away, and shows the device in connected position;

Similar reference characters indicate corresponding parts throughout the several views of the drawings.

As is known, reclosing sectionalizing circuit breakers are usually used somewhere in transformer primary feeders, but they are not relied upon entirely for protective purposes at the transformer, or for the load lines beyond. For such purposes weak links are sometimes used in the transformer primary, or external fuses in the primary or secondary. The purpose of these weak links or fuses is to disconnect the load (with or without the transformer itself) from the supply line. One disadvantage of these weak links and fuses is their relatively poor coordination with the transformer characteristics, which the present invention overcomes. Another disadvantage of the weak-link system of protection is that it is located within the transformer case where it is very difficult to make repairs, and ordinarily requires entire removal of the transformer for the purpose. These difficulties are avoided by the present invention which provides coordinated means outside of the transformer case conveniently located for repairs without the necessity for transformer removal. In addition, the invention combines into one simple construction apparatus which better performs the functions of hereto separate and individual pieces of apparatus, each uneconomically duplicating some functions of the other.

Figure 1:
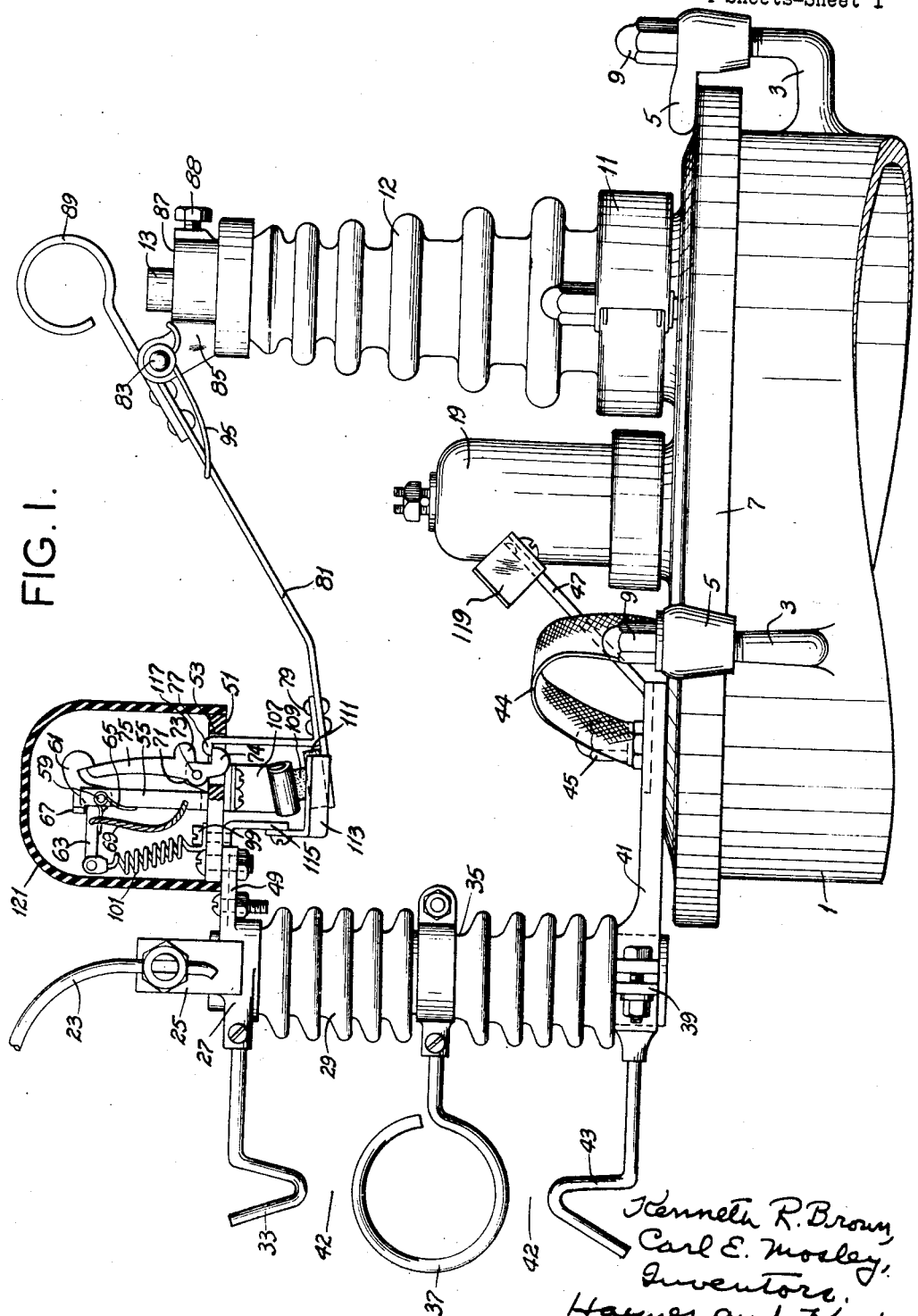
Figure 5:
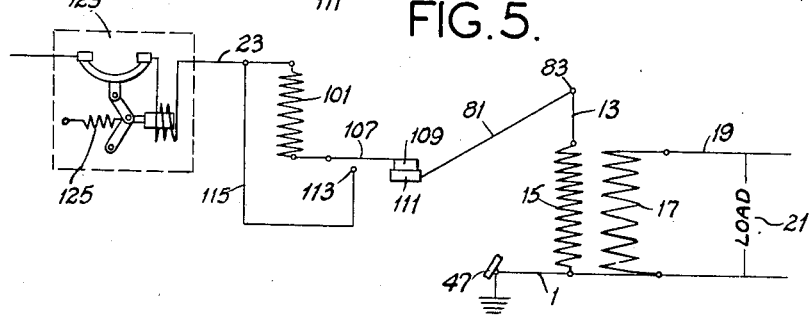
Figs. 5 and 6 are wiring diagrams corresponding to Figs. 1 and 3 respectively.
Figure 6:
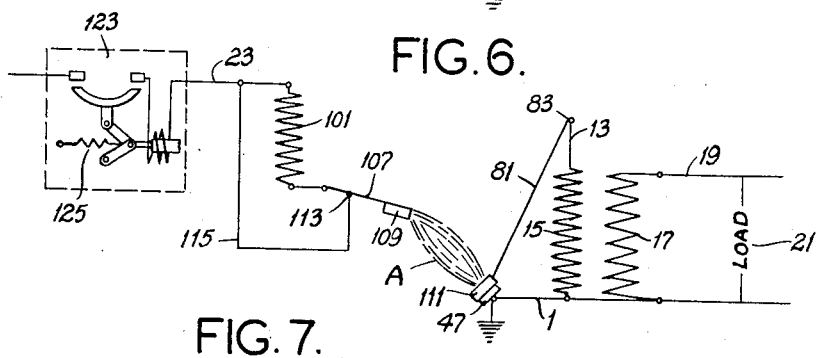

Referring now more particularly to Fig. 1, there is shown at numeral 1 a metallic transformer casing, from which extend threaded fingers 3 carrying hold-down lugs 5 for the cover 7, the lugs 5 being held in position by suitable nuts 9. On the cover 7 is the usual inlet insulator bushing 11 associated with an insulator 12 and conducting inlet tap 13. As indicated in Figs. 5 and 6, the tap 13 is connected with the primary winding 15 located within the casing 1. At its other end, the winding 15 is grounded through the case 1 of the transformer.

Within the case 1 is also a secondary winding 17 which is also grounded through the transformer casing 1. The outlet tap of winding 17 is shown at 19. It should at this point be understood that the invention is shown in connection with a single-wire load line 21 which is grounded to the transformer. This requires only the single outlet tap 19 on the transformer, but multi-wire load lines may be employed, and these require multiple taps.

At numeral 23 is shown a primary feeder which leads to a connector block 25 which is located on a conducting bracket 27. The bracket 27 is clamped to the upper end of an insulator 29, as indicated at 31, and carries an upper electrode 33. The insulator 29 also has clamped about its mid-portion 35 an intermediate electrode 37.

Clamped at 39 to the lower end of the insulator 29 and supporting it is a grounding contact bracket 41 which carries a lower grounding electrode 43. The bracket 41 is held down to the cover 7 by a nut 45 which also holds down a conducting contact 47 of a switch to be described. The transformer case, including the cover 7, and the bracket 1, form a support for the remainder of the apparatus. In order to insure a good ground connection a braided copper wire 44 may be connected under one of the nuts 9 and under the nut 45, but this is not absolutely necessary. Thus 43 and 47 are grounded through the transformer case.

Figure 2:
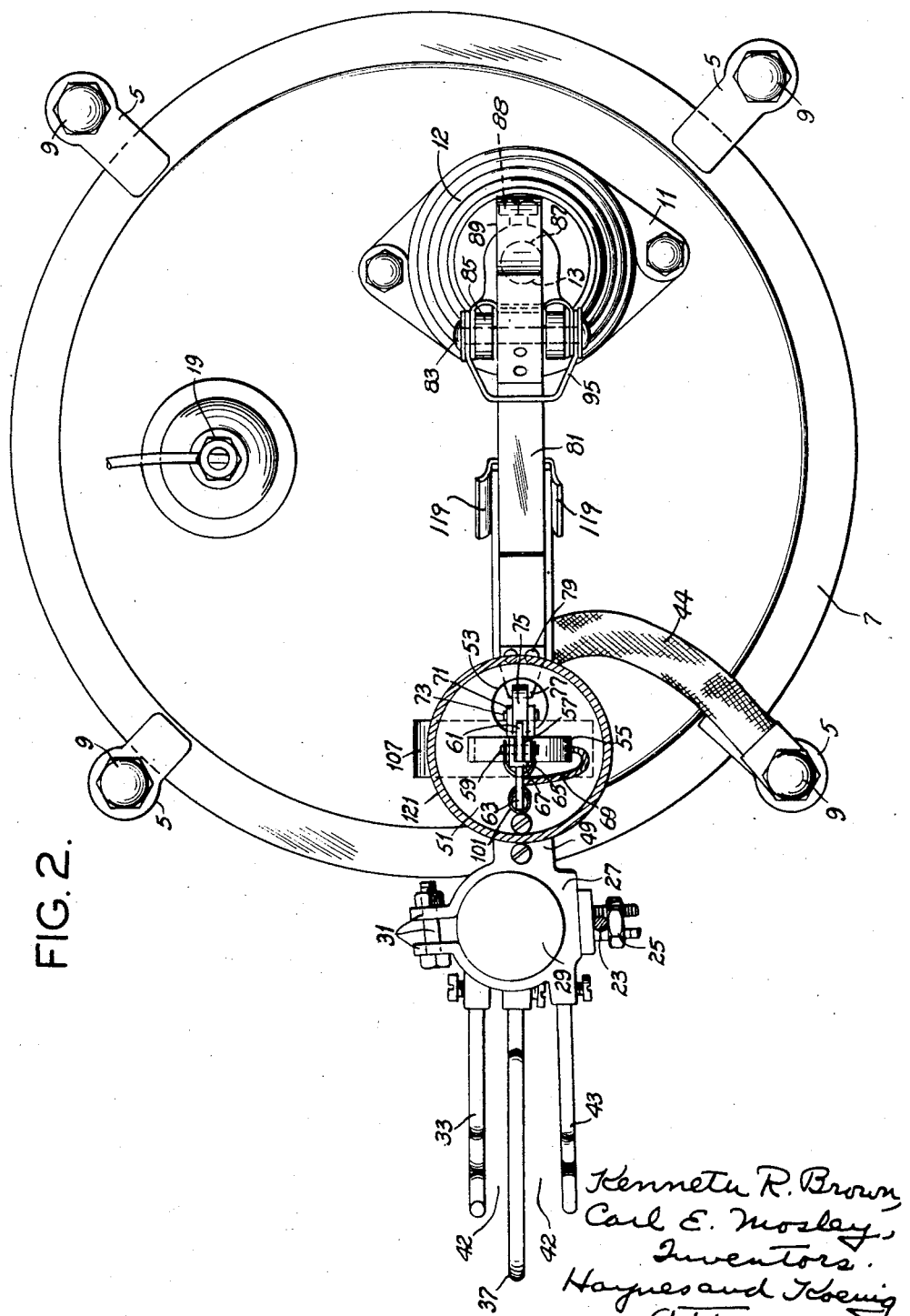
Fig. 2 is a plan view of Fig. 1, parts being broken away.

The electrodes 33, 37 and 43 are staggered in plan view (Fig. 2) and form in series two surge gaps 42, which serve as a so-called lightning arrester, to ground transient high-voltage surges of current due to lightning or the like.

On the bracket 27 is a conducting extension 49. This extension 49 supports an insulating base plate 51, in which is a hole 53. Next to the hole is a bracket 55, bifurcated at its upper end as indicated at 57. A pin 59 extends through the bifurcation and forms a rotary support for a latching hook 61. The hook 61 has an extension arm 63, both being biased clockwise by a spring 65 against a stop 67, the latter forming an extension from one side of the bifurcation 57. A braided flexible copper wire 69 forms a conductor from the arm 63 to the bracket 55, thus shunting pin 59.

A second bifurcation forming a conducting extension from the bracket 55 is indicated at numeral 71. A pin 73 through this bifurcation 71 forms a rotary support for a second latching hook 74. Extending from this hook 74 is an upwardly extending arm 75 cooperating with the latching hook 61. The point of contact between the arm 75 and the hook 61 is substantially further from the pin 73 than is the engaging portion of the hook 74. The hook 74 is engaged by a catch 77 riveted at 79 to a conducting switch arm 81. Above the hook 74 is a lug 117 for engagement by 77 which sets hook 74 into position for holding up 77. At this time the arm 75 is held up by hook 61.

Figure 3:
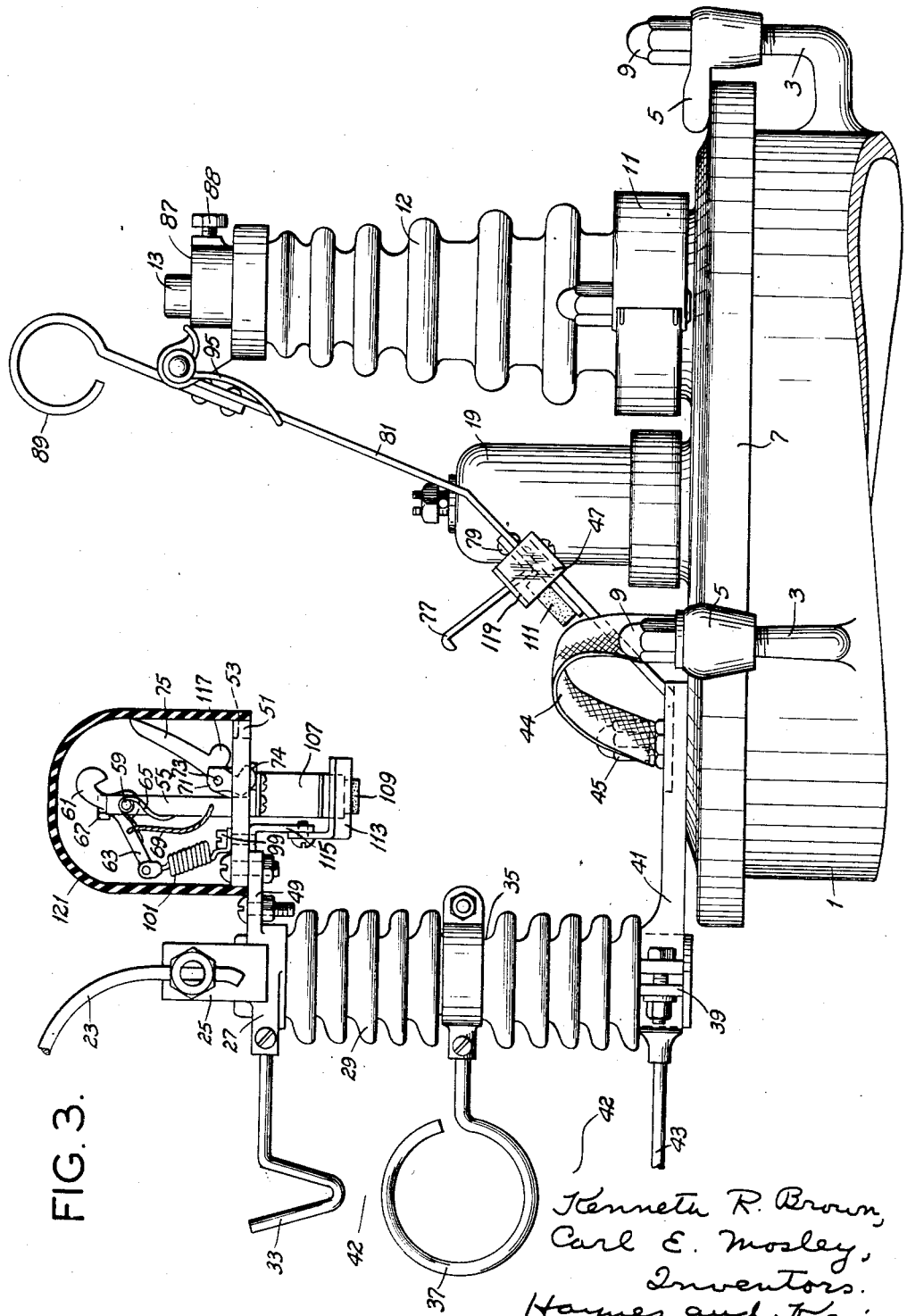
Fig. 3 is a view similar to Fig. 1, showing disconnected positions of parts.

Switch arm 81 is pivoted at 83 to a conducting collar 85 which has an opening 87 for slipping it over the end of the transformer primary tap 13. A holding screw 88 serves to hold the collar 85 in the desired adjusted position. A resetting extension 89 from the switch arm 81 is formed as an eye with which the ball end 91 of a lineman's stick 93 (Fig. 4) may be made to cooperate. A spring 95 normally biases the switch arm 81 downward, so that when the hook 74 releases the catch 77, the conducting arm 81 will spring down to engage the contact 47, as indicated in Fig. 3. This action disconnects the transformer from the feed line 23.

Figure 7:
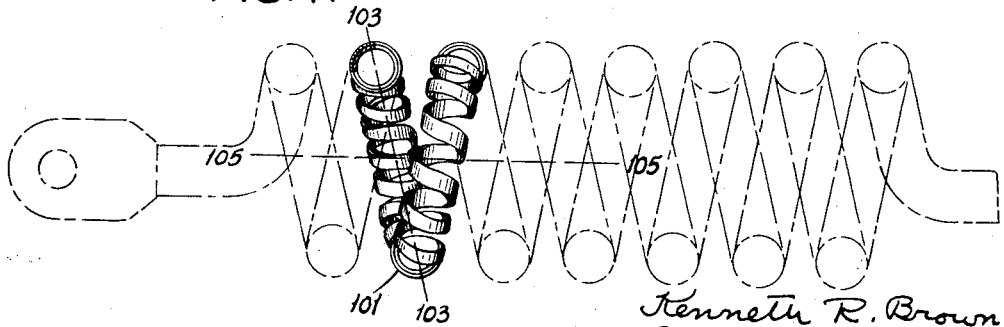
Fig. 7 is an enlarged side elevation of a thermostatic operating element, broken away, the dotted lines indicating its complete form.

Passing through the insulating disc 51 and in conducting connection with the bracket 49 is a stud 99, which also holds down and electrically connects with one end of a thermostatic element 101. The other end of the thermostatic element is attached to and in conducting relationship with the conducting arm 63. The character of the thermostatic element 101 is of importance to the present invention, and is described in particular in Parsons United States Patent 2,121,259, dated June 25, 1938. This element 101, as shown in Fig. 7, consists of bimetallic material wound along a minor helix 103 and the resulting minor-wound material is then wound along a major helix 105.

The bimetallic member so made will expand and contract in the direction of the axis of the major helix when the temperature of the structure is changed. By passing current through the helix, its temperature may be changed.

The described result in the major helix is due to the fact that the winding of the minor helix is such as to produce a torsional or twisting effect along the axis of the minor helix when the temperature changes. In accordance with one or the other metal of the bimetallic members being positioned outside or inside of the minor helix, the major helix will expand or contract along its axis when heated. The rule is that the device will contract axially along the axis of the major helix in response to heating when the metal of lesser coefficient of thermal expansion is outside, and the present device is so arranged. Thus, when current passes through the thermostatic element 101, the element tends to heat and to contract.

An advantage of the thermostatic element 101 is that its deflections (which are in response to current-induced heat) provide a time-current relationship which coordinates quite closely with the time-current relationship of the transformer under safe loading conditions. An advantage of the particular form of thermostat is that the degree of movement produced in response to current is great. The amount of space occupied by the thermostat is also small.

It is to be understood that other devices having the desirable time-current relationships may be substituted for the member 101, such as a heavy bimetal strip, electrically-heated, fluid-containing bellows, et cetera.

From the above, it will be seen that, when the device is in connected position (Fig. 1), current will flow from the line 23, through 25, 27, 49, 99, thermostat 101, arm 63, wire 69 and bracket 55.

To complete the circuit, the bracket 55 has fastened in conducting relation thereto beneath the base plate 51, a spring contact 107 having a carbon brush 109 engageable by a carbon brush 111 on the conducting switch arm 81. The contact 107 is a U-shaped spring and when the switch arm is down (Fig. 3) is adapted to spring down into contact with a by-pass or shunt member 113, which is in conducting relationship with a finger-like extension 115 of the bracket 49. An insulating cover 121 surrounds the disc 51 and covers the thermostatic release mechanism, protecting the same against weather. Guide flanges 119 on the contact 47 guide the switch arm 81 during final downward movement.

In Figs. 5 and 6 is indicated the fact that in the feed line 23 is inserted a sectionalizing, reclosing oil circuit breaker 123. Starting with the parts as shown in Fig. 1, operation is as follows:

The helical thermostatic element 101, being relatively cool, is relatively elongated, thus permitting clockwise bias of the arm 63 and hook 61. Hook 61 holds the arm 75 and hook 74, so that the catch 77 of the switch arm 81 is supported. Current then flows through the circuit breaker 123 which is at this time closed, then through the supply line 23 to connector 25, brackets 27, 49, screw 99, thermostatic element 101, arm 63, shunt 69 and bracket 55, contact 107, carbon brushes 109, 111, switch arm 81, collar 85, transformer primary tap 13, primary winding 15, and to ground through the transformer case 1. The radiation characteristics of the thermostatic element 101 are such that, under normal conditions, no release will occur.

This normal current may flow indefinitely without release, and excessive currents may flow for predetermined periods consistent with the ability of the transformer to withstand these without damage.

Should a fault occur in the transformer winding or in the load circuit 21, or an overload, such as will engender a heavier current through the primary winding 15 then the current through the thermostatic element 101 increases. If the increase is relatively small, the thermostatic element 101, due to its heat dissipating characteristic, will carry it a relatively longer time before contracting enough to release arm 75 from the holding hook 61. On the other hand, if the overdraft of current is relatively heavy, then the heat dissipating characteristics of the element 101 are such that the elongation will occur more quickly. This kind of relationship is similar to the one that occurs in the transformer. That is to say, the transformer may assume a relatively small increase in current in the primary 15 and its heat-dissipating characteristics are such that damage will not be done for a relatively long period. On the other hand, with relatively heavier current through the primary 15, the heat-dissipating characteristics are such that damage will be done sooner. The fact that the thermostatic element 101 and the transformer both depend upon heat radiation (thermostatic element for shortening and the transformer for burning out), the two are desirably coordinated. Hence, at all loads, the thermostatic element will prevent release of the arm 75 for as long a time as is possible consistent with absence of damage to the transformer, this being because the progress of the shortening of the thermostatic element 101 in response to increased current is of the same order as the progress of the transformer toward a burn-out condition in response to increased current.

Since the thermostatic element and the transformer both have similar radiation characteristics, it follows that any change in the ambient temperature around the transformer and the thermostatic element mounted thereon will have no serious effect in the proper coordination between the characteristics of the releasing means and of the transformer.

Assuming now that excessive current, whatever its value, has passed through the thermostatic element for a period long enough to cause the hook 61 to release the arm 75 and the hook 74 to release the catch 77, the downward bias of the spring 95 will rotate the switch arm 81. This does several things: first, it allows the U-shaped contact 107 to spring down onto the shunt member 113. The carbon brushes 109 and 111 will separate, while the switch arm 81 descends to engagement with the grounding contact 47. This brings about the condition shown in Fig. 6, wherein the primary tap 13 is grounded, thus disconnecting the transformer and the load from the line 23. This may or may not draw an arc between the brushes 109 and 111, depending upon the period in the cycle at which the break was made. An arc is indicated, for example, in Fig. 6 by the dotted lines A. This arc is led or deflected down to the member 119 and thus to ground via the supporting parts 47, 7, 1. As the switch arm 81 engages the contact 47, the impedance of the transformer is decreased because the transformer winding is thus shunted out. This introduces a line-to-ground-fault condition which increases the current in the arc. This is enough to operate the circuit breaker 123 to open, since 123 is current-operated. Then, arc A will automatically extinguish, and the automatic reclosing of the circuit breaker 123 by means of its spring 125 restores service to any devices connected with the supply line 23, with the exception of the transformer herein described, which then is separated from this line by the gap existing where the arc A was.

Regarding the formation of the arc between the brushes 109 and 111, it will be observed that no special arc extinguisher is used on the present device, although the position of the arc is such as to favor self-extinguishment. And, quite often the arc is of such a small amount that it breaks itself without the sectionalizing circuit breaker 123 even coming into operation.

The cause for increased current flow, such as will operate the circuit breaker, may be a failure in the transformer, which usually decreases the impedance. When overload or failure occurs in the line connected to the transformer, the current flow is increased by ordinary inductive action through the transformer.

Figure 4:
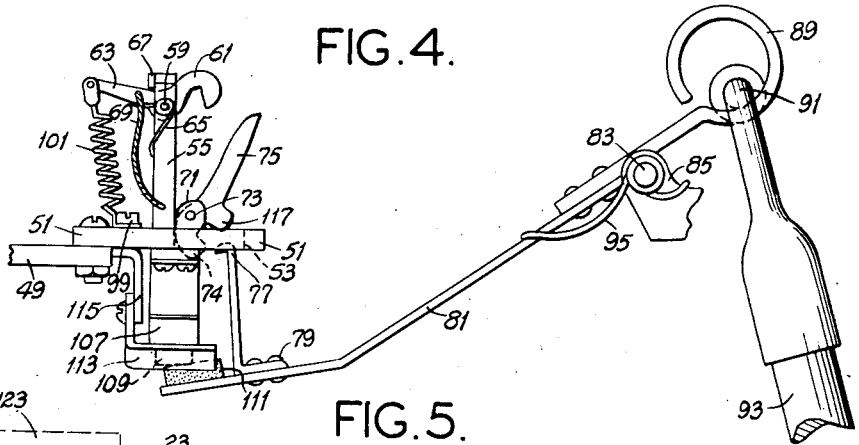
Fig. 4 is a view similar to Fig. 3, but fragmentary and showing an intermediate, resetting position.

The device may be reset by means of a lineman's stick 93, as indicated in Fig. 4. Its ball end 91 is applied to the installing ring 89 and pulled down. This raises the switch arm 81 so that the carbon brushes 109 and 111 contact, thereby also raising the contact 107 from the shunt 113.

Fig. 4 illustrates the fact that the carbon brushes 109 and 111 in an intermediate reclosing position of the switch arm 81 make a load current connection before the contact 107 is lifted from the shunt 113. Hence pick-up of the load by the switch arm 81 through the carbon brushes occurs before the catch 77 engages the latch hook 74, thus preventing the latch mechanism as a whole from transmitting the load current and arcing at its various points of mechanical engagement.

Lightning on the line 23 causes little or no trouble, because of the better inverse time-current characteristics of the thermal element 101. Thus, surge currents that ordinarily burn out fuse links are better carried. The surge is simply grounded through the surge gaps 42. The use of the old fuse links caused more lightning outages.

In general, a weak link often melts when it is not supposed to, which means that the transformer must be replaced. Because such a weak link has inverse time-current characteristics inferior to those of the present apparatus, the weak link will sometimes fail to remove a faulty transformer from the line, and at the same time, the fault may be severe enough to cause the oil circuit breaker to lock out. Under such circumstances, in order to find the faulty transformer, the lineman must test each transformer installation by disconnecting it from the line until he locates the trouble. The present apparatus automatically indicates the location of the trouble, first, because it operates certainly, and secondly because it is in a place on the outside of the transformer where it can be seen.

The thermostatic means is also of advantage in coordination with house circuit breakers in which bimetal elements are employed.

It is to be understood that, while the thermal element 101 is ideal for effecting a release, some of the advantages of the invention may be obtained by employing a suitable fusible element at this point, as for example, the matter of purposeful drawing of the arc at A when necessary with subsequent operation of the sectionalizing cutout 123 to extinguish the arc.

Also, a reclosing fuse switch or the like may constitute the circuit breaker 123, or equivalent device, the term circuit breaker being intended to be generic to any circuit opening means responsive to current caused by grounding the arc A at 41.

Although the device is useful as described for the grounded type of neutral circuit, the principle can also be applied to the less used delta and analogous circuits.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. An electrical protective device for use between a line leading from a reclosing circuit breaker to a transformer having a primary tap and internal coils connected to its case, and means for grounding the case; comprising a thermostatic element responsive to heat caused by current flowing from said line, a contact in series with said line, a movable switch arm connected in series with the inlet tap of the transformer, means for holding said movable switch means in engagement with said contact comprising a latch construction which is responsive to said thermostatic element to release upon a predetermined heated condition of the thermostat, means for biasing said switch arm away from said contact upon release and into electrical engagement with a grounded part on said transformer case, whereby the transformer is disconnected from said supply line, any arc that is drawn between said switch arm and contact operating when grounded to cause said reclosing circuit breaker temporarily to open, said arc itself being broken in response to opening of the circuit breaker.

2. An electrical protective device for use between a line leading from a reclosing circuit breaker to a transformer having a primary tap and internal coils connected to its case, and means for grounding the case; comprising a thermostatic element responsive to heat caused by current flowing from said line, a contact in series with said line, a movable switch arm connected in series with the inlet tap of the transformer, means for holding said movable switch means in engagement with said contact comprising a latch construction which is responsive to said thermostatic element to release upon a predetermined heated condition of the thermostat, means for biasing said switch arm away from said contact upon release and into electrical engagement with a grounded part on said transformer case, whereby the transformer is disconnected from said supply line, any arc that is drawn between said switch arm and contact operating when grounded to cause said reclosing circuit breaker temporarily to open, said arc itself being broken in response to opening of the circuit breaker, an insulator supported on the transformer and supporting the thermostatic element with the latch construction, and said primary tap supporting the movable switch arm.

3. An electrical protective switch comprising a conducting member at one potential, a releasable latch mechanism, a conductive thermostatic means controlling the release and latching actions of said latch mechanism, a supply line terminal in conductive relation with said thermostatic means and insulated from said conducting member and being at another potential, a movable conducting and arc-deflecting switch member having a mount insulated with respect to said conducting member and engaging with said latch in one position to be normally held latched thereby, means biasing said switch member to another position wherein it is in conductive relationship with said conducting member, means for conductively connecting the switch member with a device to be served with current, means associated with said switch member for moving it from its position of contact with the conducting member to its latched position, said thermostatic means being in series conductive relation with said switch member when the latter is in latched position, said thermostatic means upon abnormal current flow there-through releasing said latch to permit biased travel of said switch member from its normal latched position through a sequence of arc-deflecting positions and into its contacting position with respect to said conducting member, whereby arcing current is deflected to said conducting member from passage through said device being served.

4. An electrical protective switch comprising a conducting support at one potential, separate insulators on said support, a releasable latch mechanism supported on one insulator, a thermostatic member associated with the latch mechanism, a line terminal in conductive relation with said thermostatic member and being at another potential, a conducting member movably mounted on the other insulator and having means engaging with said latch in one position and biased to another position wherein it is in engagement with said support, means associated with said switch element for manually moving it from its support-engaging to its latched position, said thermostatic member comprising an element in electrical conductive relation between said line terminal and said switch arm and being adapted to heat when the switch arm is in latched position, said thermostatic member in response to abnormal current flow there-through releasing said latch to permit biased movement of said switch member to its position of engagement with the support, and in response to normal current flow causing holding of said switch member in latched position when so set.

5. An electrical protective switch comprising a support at one potential, insulators on said support, a latch mechanism on one of the insulators, a switch arm pivoted from the other insulator and having an end engageable with said latch mechanism to be held thereby in one position, means for biasing said switch arm from said one position to a second position in which it is in contact with said support, means associated with said arm for manually moving it from a second position to its latched position against said bias, a line terminal associated with the latch mechanism, and being at a potential different from that of the support, a thermostatic element having a series circuit relation to said line terminal and said switch arm when the latter is in latched position, means operated by said thermostatic element to hold the latch mechanism in position to maintain a latched position of the switch arm when the thermostatic element is cold and to release said latch mechanism when the thermostatic element is hot enough to release said switch arm for biased movement toward said support.

6. An electrical protective switch comprising a support at one potential, insulators on said support, a latch mechanism on one of the insulators, a conducting switch arm pivoted from the other insulator and adapted to swing between a latched position of an end engageable with said latch mechanism, to be held thereby, means for biasing said switch arm from said one position to a second position in which it engages said support, means associated with said arm for manually moving it against said bias from the last-named position to its latched position, a line terminal associated with the latch mechanism, a thermostatic element having a heating element in a series circuit relation to said line terminal and with said switch arm when the latter is in latched position, means operated by said thermostatic element to hold the latch mechanism in position to maintain a latched position of the switch arm when the thermal element is cold and to release said latch mechanism when the thermal element is hot to release said switch arm for biased movement toward said support, said latch mechanism effecting automatic latching of said arm upon manual movement toward latched position and when said thermostatic element is cold.

7. An electrical protective switch comprising a support, a movably mounted switch arm having an insulated mount with respect to said support and arranged for electrical connection with apparatus to be protected and supplied with current, said switch arm being movable from a latched position to a position to engage said support, means biasing said switch member toward said last-named position, a latch mechanism also having an insulating mount with respect to said support for normally holding said switch member in latched position, a line-wire connection associated with said latching mechanism, said mechanism consisting of a contact engageable by said switch member in its latched position, a latch for holding said switch member in said latched position and against the contact, a catch for the latch, a thermostatic member controlling said catch and responsive to heat generated by abnormal current flowing from said line-wire connection to said contact and through said switch member, said connection being in series circuit relation to said switch member, said thermostatic member being adapted to move the catch to release the latch under said current heating conditions, whereby said switch arm is released by the latch to be biased to its support-engaging position.

8. An electrical protective switch comprising a support, a movably mounted switch arm having an insulated mount with respect to said support and arranged for electrical connection with apparatus to be protected and supplied with current, said switch arm being movable from a latched position to a position engaging said support, means biasing said switch member toward said last-named position, a latch mechanism also having an insulating mount with respect to said support for normally holding said switch member in latched position, a line-wire connection associated with said latching mechanism, said mechanism consisting of a contact engageable by said switch member in its latched position, a latch for holding said switch member in said latched position, a catch for the latch, a thermostatic member controlling said catch and responsive to heat generated by abnormal current flowing from said line connection to said contact and said switch member, said line terminal being in series circuit relation to said switch member, said thermostatic member being adapted to move the catch to release the latch under said current heating conditions, whereby said switch arm is released to be biased to its position engaging the support, said thermostatic member being also in series circuit relation between said line terminal and said contact when the switch member is in latched position, said switch member as it passes from latched position to its support-engaging position being adapted to draw an arc whereby under certain overloads any circuit breaker in the line serving said line terminal will be opened, and means automatically closed by movement of the switch member from the latched position to by-pass arcing current around said thermostatic element.

KENNETH R. BROWN.
CARL E. MOSLEY.